United States Patent
Alimpich et al.

(10) Patent No.: US 6,232,968 B1
(45) Date of Patent: *May 15, 2001

(54) DATA PROCESSOR CONTROLLED DISPLAY SYSTEM WITH A PLURALITY OF SWITCHABLE CUSTOMIZED BASIC FUNCTION INTERFACES FOR THE CONTROL OF VARYING TYPES OF OPERATIONS

(75) Inventors: Claudia Alimpich; Benjamin Nelson Jeffcoat, both of Boulder; Deborah Elizabeth Neuhard; Luana Linda Vigil, both of Longmont; James Philip John Wittig, Boulder, all of CO (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/053,214

(22) Filed: Mar. 31, 1998

(51) Int. Cl.$^7$ .................................................. G06F 3/00
(52) U.S. Cl. ........................ 345/333; 345/335; 345/337; 345/339; 345/970; 345/965; 700/83
(58) Field of Search ................................ 345/333, 334, 345/335, 337, 339, 336, 969, 965, 349, 970, 353; 364/188; 709/302

(56) References Cited

U.S. PATENT DOCUMENTS

| | | | | |
|---|---|---|---|---|
| 5,425,140 | * | 6/1995 | Bloomfied et al. | 345/353 |
| 5,481,668 | * | 1/1996 | Marcus | 345/349 |
| 5,551,037 | * | 8/1996 | Fowler et al. | 709/300 |
| 5,581,685 | * | 12/1996 | Sakurai | 345/353 |
| 5,825,361 | * | 10/1998 | Rubin et al. | 345/349 |
| 5,864,782 | * | 1/1999 | Mederer et al. | 702/182 |
| 5,874,955 | * | 2/1999 | Rogowitz et al. | 345/339 |

* cited by examiner

Primary Examiner—Raymond J. Bayerl
Assistant Examiner—Cuong T. Thai
(74) Attorney, Agent, or Firm—Julius B. Kraft; David W. Victor; Konrad Raynes & Victor

(57) ABSTRACT

A data processing controlled display system for the interactive control of a variety of operations is provided which offers to an operator a plurality of selectable sets of basic interactive functions (i.e. an interactive display interface), each set respectively for the control of one of a plurality of types of operations. There are also provided means for switching a selected first one of said plurality of interactive display interfaces to a selected second one of said display interfaces and means for interactively controlling another one of said production control operations through said second selected interface.

38 Claims, 15 Drawing Sheets

DATA PROCESSOR CONTROLLED DISPLAY SYSTEM WITH A PLURALITY OF SWITCHABLE CUSTOMIZED BASIC FUNCTION INTERFACES FOR THE CONTROL OF VARYING TYPES OF OPERATIONS

CROSS-REFERENCE TO RELATED COPENDING PATENT APPLICATIONS

The following patent applications which are assigned to the assignee of the present invention cover subject matter related to the subject matter of the present invention: "Data Processor Controlled Display System With a Plurality of Selectable Basic Function Interfaces for the Control of Varying Types of Customer Requirements and With Additional Customized Functions", U.S. Ser. No. 09/053,210; "Data Processor Controlled Display System for the Control of Operations With Control Properties Which are Selectably Constant or Variable", U.S. Ser. No. 09/053,207; "Data Processor Controlled Display Interface With Tree Hierarchy of Elements View Expandable into Multiple Detailed Views", U.S. Ser. No. 09/053,209; "Data Processor Controlled Interface with Multiple Tree of Elements Views Expandable into Individual Detail Views", U.S. Ser. No. 09/052,858; "Data Processor Controlled Display With a Tree of Items With Modification of Child Item Properties Designated at Parent Level Without Modification of Parent Item Properties", U.S. Ser. No. 09/053,211; and "Data Processor Controlled Display System With a Tree Hierarchy of Elements View Having Virtual Nodes", U.S. Ser. No. 09/053, 213; all are assigned to International Business Machines Corporation by Claudia Alimpich et al. and all are filed concurrently herewith.

TECHNICAL FIELD

The present invention relates to interactive computer controlled display systems for controlling operations and particularly to user friendly display interfaces for the control of such operations.

BACKGROUND OF THE INVENTION

Application programs are used in all aspects of business, industry and personal/home endeavors. There is a large and diverse segment of consumers and workers that must interface with these applications. A vendor of an application program takes into consideration the typical skill level of a group of users for which the application is targeted in order to create the most "easy to use" interface to the application without sacrificing necessary functional features needed by the user to use the application.

Some vendors offer different versions of essentially the same application program, where the versions differ only in the user interface provided with the application program. This allows the vendor to target the same application program to various groups of users having different and varying skill leve3ls. The varying skill levels may include computer skills or job specific skills for which the application was created.

For example, in production operations including but not limited to the printing trades, the production of parts, tools and dies, integrated circuit manufacturing and processing and chemical industrial production, the operations typically involve repetitive functions performed over relatively long periods of time. Computerization of such operations takes advantage of the strengths of the computer for handling these functions effectively. Also, it can reduce the operator skill level required for many of the operations and increase the productivity of all operators including those still needing high level skills to run and manage the operations.

Nevertheless, computerized production operations require user interfaces that accurately reflect the control requirements and options needed by an operator to run and manage the operations. As such, user interfaces can become more and more complex with hundreds of functional operations for all of the possible operating scenarios the operator may face. Typically, application vendors will design specific purpose software programs with specific display interfaces tailored to the specific production operations where the runs are long term and of the same type of operations with few changes.

However, if every customer of the application vendor has different production control requirements, it may be too expensive and too inefficient for the vendor to provide a user interface tailored to each customer's specific production needs. Also, many production operations are not pure, i.e. the operations take on characteristics of other production environments.

For example, a "pure" commercial print shop operation may print manuals, books or other "print for profit" types of printing. A "pure" production print shop may be involved in printing large volumes of statements, invoices, bills, etc. for organizations. A "pure" network print environment may involve a multitude of low volume printing operations from individual workers in an office environment.

In specific, there is a need for an user interface for operators who manage print jobs and printers in each of these three different environments. Separate application programs, each with their own user interfaces have been provided to customers in each of these different print operating environments since each environment theoretically has its own operating requirements. However, in the real world, these environments are not "pure", i.e. any one of these environments can have similarities to another environment. Typically, it is difficult for a software provider to categorize a given customer into some of these pure environments. In addition, some customers may want additional function than what has been provided for their environment; of, if a customer has users with more novice skill levels, the customer may desire a user interface that limits the things that the users are allowed to do. Thus, providing an application program with just the "right" user interface for each and every customer has been a difficult problem for application program vendors to handle.

SUMMARY OF THE INVENTION

The present invention offers a solution to the above problems by providing a given application program with multiple selectable user interfaces or, rather, multiple selectable views of a same user interface where each view has a different set of interactive functions of the user interface. Each selectable view may be for a specific operating environment and/or for a specific skill level of a potential user. At the beginning of the application program, the user selects which view of the user interface the user wants. The application with the selected view is presented to the user in a separate window. In another embodiment, when the application is invoked, at least for the first time, separate windows of the application are presented to the user with each window having a different "default" view of the user interface. As such, multiple windows or views of the application can be displayed to the user with each window or view representing a different set of interactive functions of the user interface. In addition, the user can switch back and forth (such as by activating and deactivating various windows or views) among the various sets of interactive functions for the control of multiple operating environments using the same currently executing application program. Furthermore, in accordance with a related application U.S. Ser. No. 09/053,210 which provides for customization of each of the "default" views of the user interface, the user can switch back and forth with respect to any view of the application regardless of whether the view has an original default set of interactive functions or a subsequently customized set of interactive functions of the user interface.

More specifically, the present invention relates to a data processor controlled display system for the interactive control of a plurality of types of production operations comprising means for providing a plurality of selectable sets of basic interactive functions, each set respectively for the control of one of said plurality of types of production operations. Each of these function sets will provide a simple and basic interface which the program designer believes will provide all of the basic functions needed to control its corresponding production operation. Then there are means for interactively selecting a plurality of said sets of basic functions for customization of each of said selected plurality of sets and means for providing a plurality of selectable secondary functions for supplementing said selected plurality of sets of basic functions in their respective production operation controls. At least one of these secondary functions is respectively selected for each of said selected plurality of sets of basic functions and respectively combined with each of said selected plurality of sets of basic functions into a plurality of selectable customized interactive display interfaces for the control of a plurality of said production operations. In the customization, basic functions may be similarly deleted. The invention further provides means for selecting a first one of said plurality of customized interactive display interfaces and means for interactively controlling one of said production control operations through said selected customized interface together with means for switching from said selected first one of said plurality of customized interactive display interfaces to a selected second one of said customized display interfaces, and means for interactively controlling another one of said production control operations through said second selected customized interface.

DETAILED DESCRIPTION OF THE PREFERRED EMBODIMENT

Figure 1:
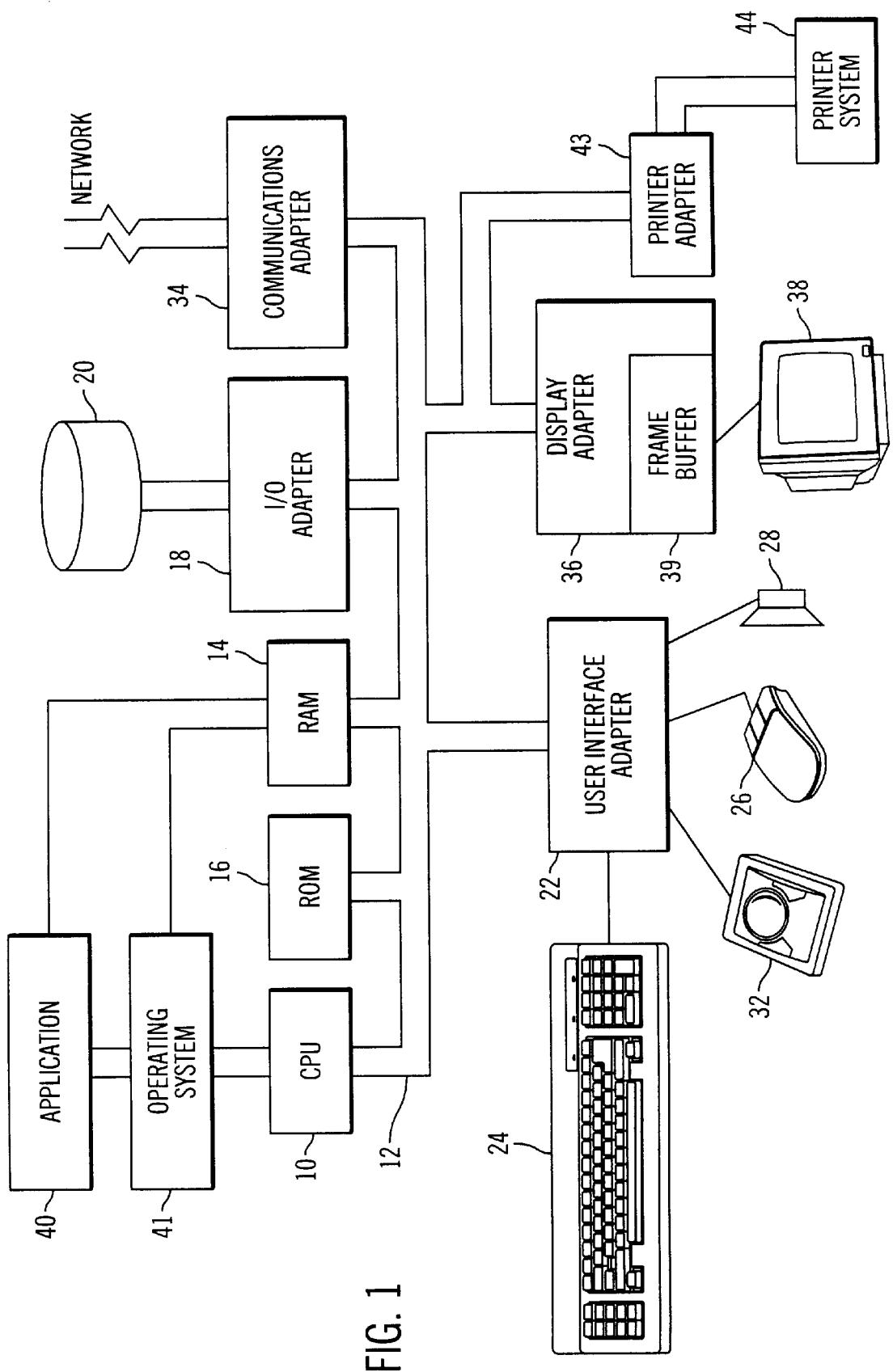
FIG. 1 is a block diagram of an interactive data processor controlled display system including a central processing unit which is capable of implementing the production operations control program of the present invention.

Referring to FIG. 1, a typical data processing system is shown which may function as the computer controlled display terminal used in implementing the production operations control functions in the present invention. A central processing unit (CPU) such as one of the PC microprocessors available from International Business Machines Corporation is provided and interconnected to various other components by system bus 12. An operating system 41 runs on CPU 10 and provides control and is used to coordinate the function of the various components of FIG. 1. Operating system 41 may be one of the commercially available operating systems such as the OS/2 operating system available from International Business Machines Corporation (OS/2 is a trademark of International Business Machines Corporation); Microsoft's Windows 95™ or Windows NT™, as well as UNIX or AIX operating systems. A programming application for monitoring and controlling a production operation, application 40, to be subsequently described in detail, runs in conjunction with operating system 41 and provides output calls to the operating system 41 which implement the various functions to be performed by the application 40. A read only memory (ROM) 16 is connected to CPU 10 via bus 12 and includes the basic input/output system (BIOS) that controls the basic computer functions. Random access memory (RAM) 14, I/O adapter 18 and communications adapter 34 are also interconnected to system bus 12. It should be noted that software components, including the operating system 41 and the application 40, are loaded into RAM 14 which is the computer system's main memory. I/O adapter 18 conventionally communicates with the disk storage device 20, i.e. a hard drive. Communications adapter 34 interconnects bus 12 with an outside network enabling the data processing system to communicate with other such systems over a local area network (LAN) to control production operations. I/O devices are also connected to system bus 12 via user interface adapter 22 and display adapter 36. Keyboard 24, trackball 32, mouse 26 and speaker 28 are all interconnected to bus 12 through user interface adapter 22. It is through such input devices that the user interactive functions involved in the displays of the present invention may be implemented. Display adapter 36 includes a frame buffer 39 which is a storage device that holds a representation of each pixel on the display screen 38. Images may be stored in frame buffer 39 for display on monitor 38 through various components such as a digital to analog converter (not shown) and the like. By using the aforementioned I/O devices, a user is capable of inputting information to the system through the keyboard 24, trackball 32 or mouse 26 and receiving output information from the system via speaker 28 and display 38. In the preferred embodiment, which will be subsequently described, the production operation will be the control of high throughput printers such as electrophotographic or laser printers. A local printer system 44 may be accessed and controlled via printer adapter 43 while, as previously mentioned, networked printers may be communicated with via communications adapter 34.

There will now be described a simple illustration of the present invention with respect to the display screens of FIGS. 2 through 11. When the screen images are described it will be understood that these may be rendered by storing an image and text creation programs such as those in any conventional window operating system in the RAM 14 of the system of FIG. 1. The operating system is diagrammatically shown in FIG. 1 as operating system 41. Display screen images are presented to the viewer on display monitor 38 of FIG. 1. In accordance with conventional techniques, the user may control the screen interactively through a conventional I/O device such as mouse 26 of FIG. 1 which operates through user interface 22 to call upon programs in RAM 14 cooperating with the operating system 41 to create the images in frame buffer 39 of display adapter 36 to control the display on monitor 38.

Figure 2:
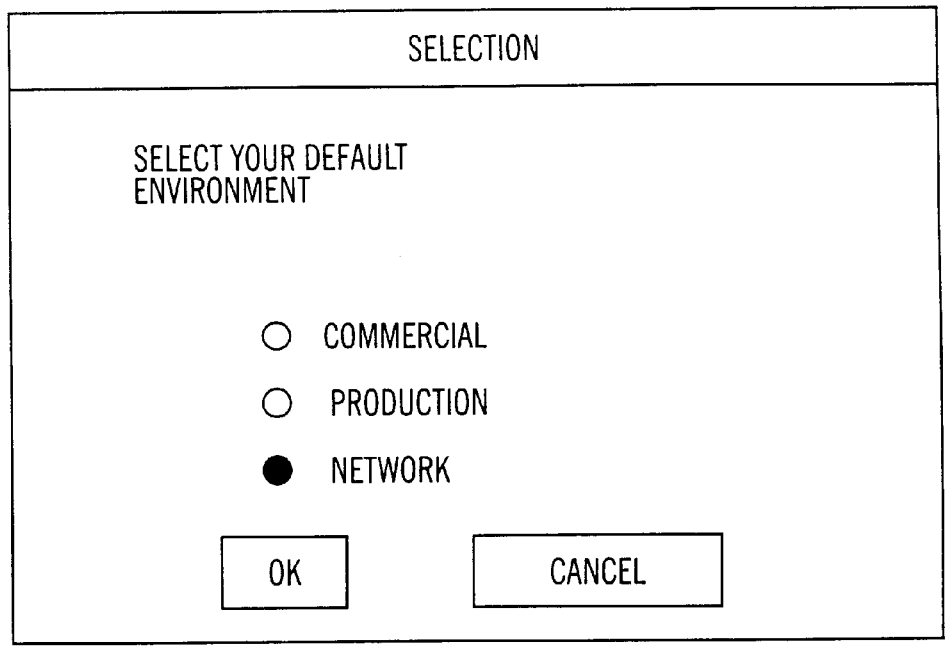
FIG. 2 is a diagrammatic view of a portion of a display screen on which a menu for the interactive selection of one of a plurality of types of printer production operations before customization may be selected and graphically represented.
Figure 7:
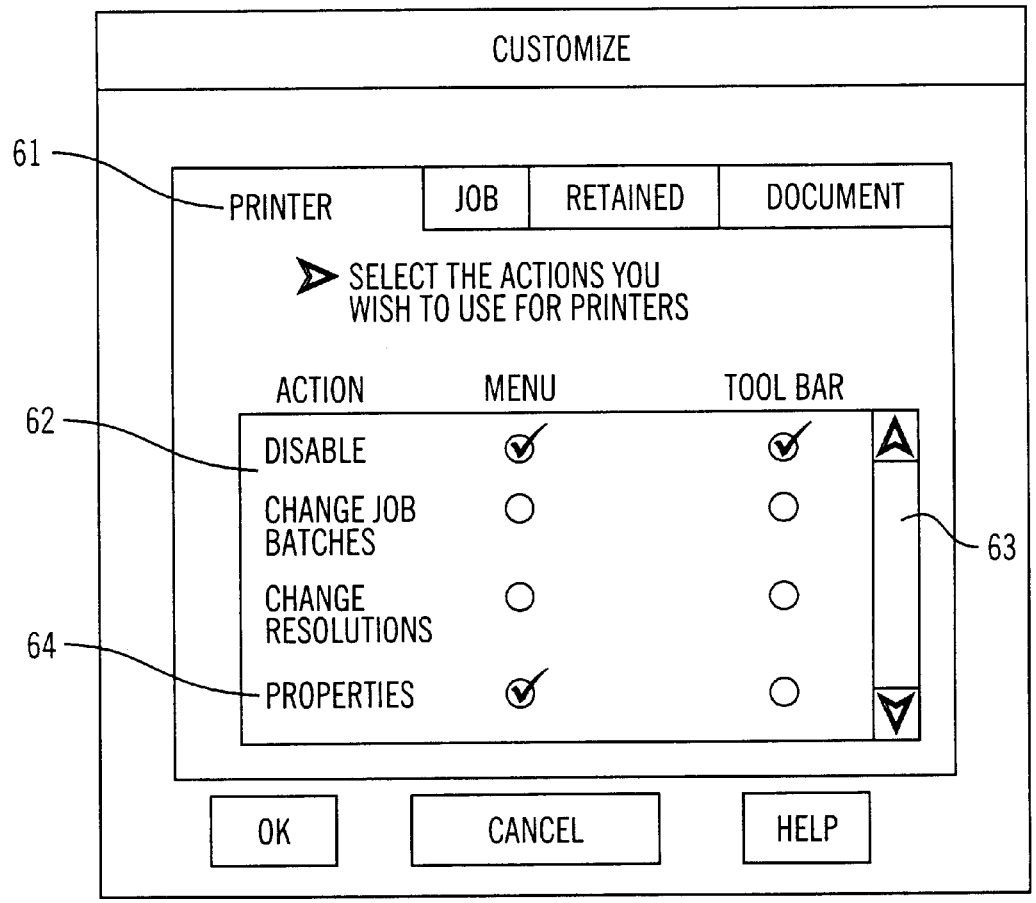
FIG. 7 is a diagrammatic view of a portion of a display screen on which a menu for the interactive customization of a basic set of control functions to add functions is shown.
Figure 3:
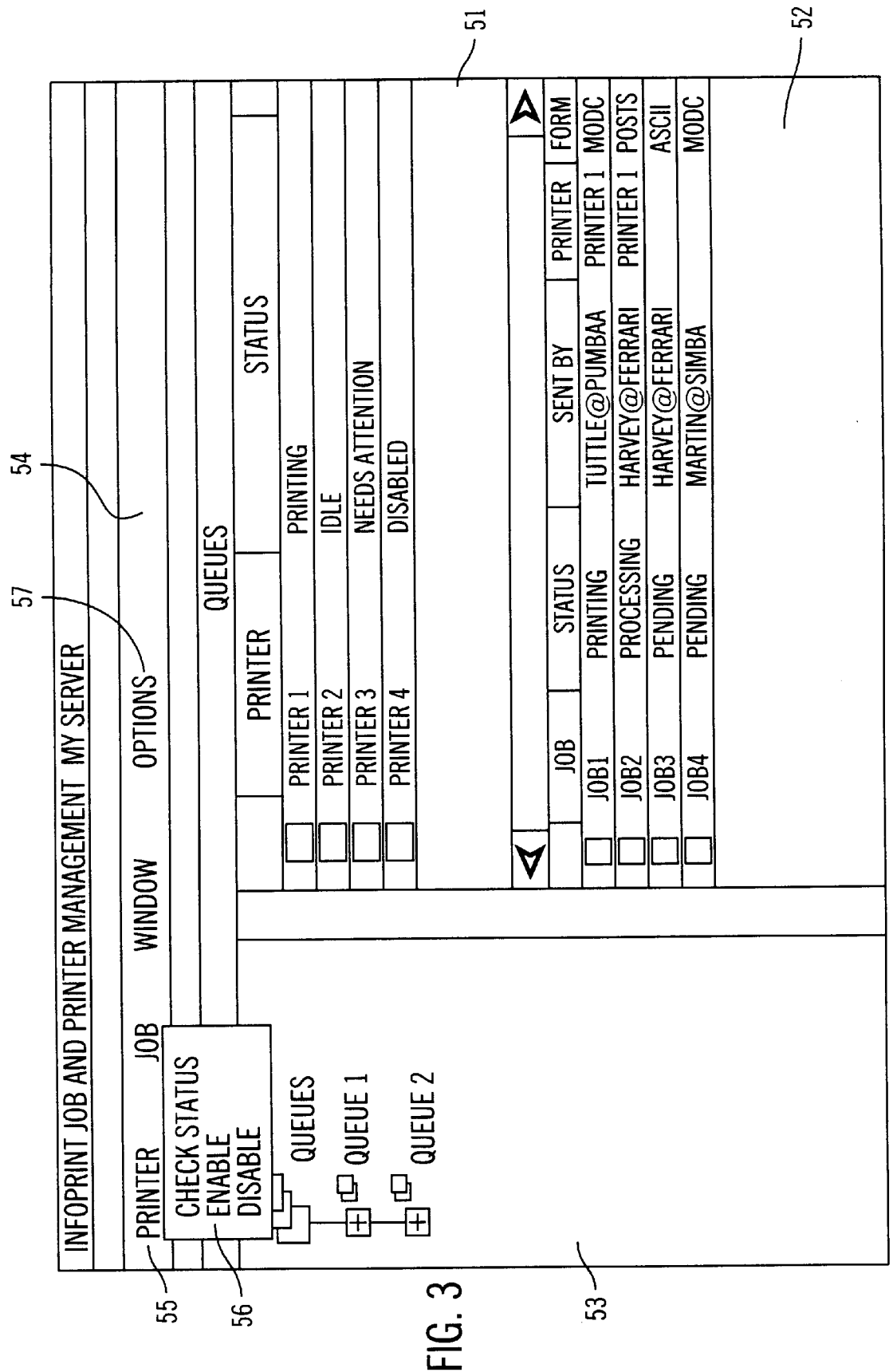
FIG. 3 is a diagrammatic view of a portion of a display screen including a basic set of uncustomized printer control functions which may be used in the control of a representative one type of printer operation, network printer production operations.
Figure 4:
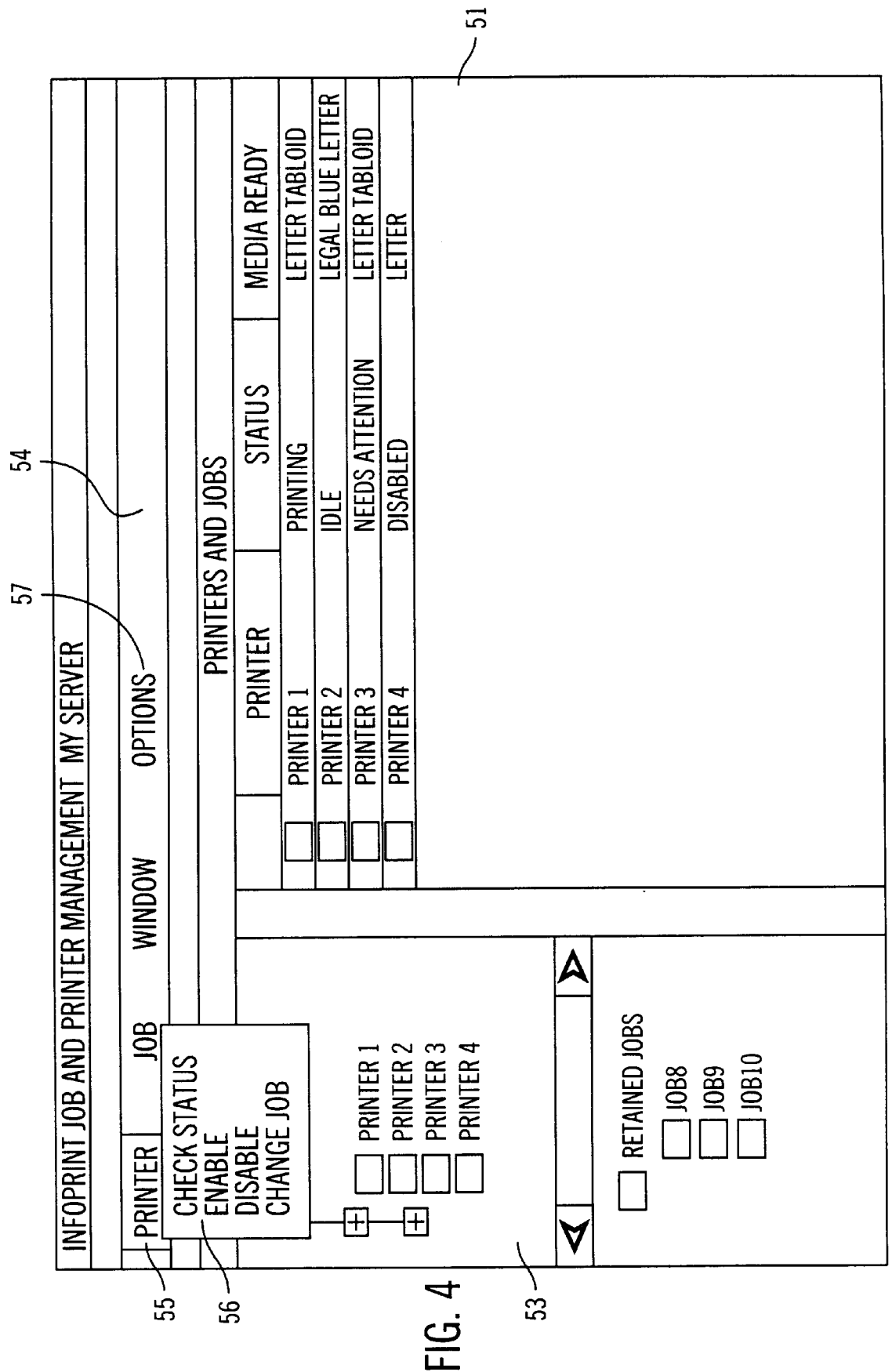
FIG. 4 is a diagrammatic view of a display screen like that of FIG. 3 including a basic set of uncustomized printer control functions except that it is for the control of a second type of printer operations, commercial printer production operation.
Figure 5:
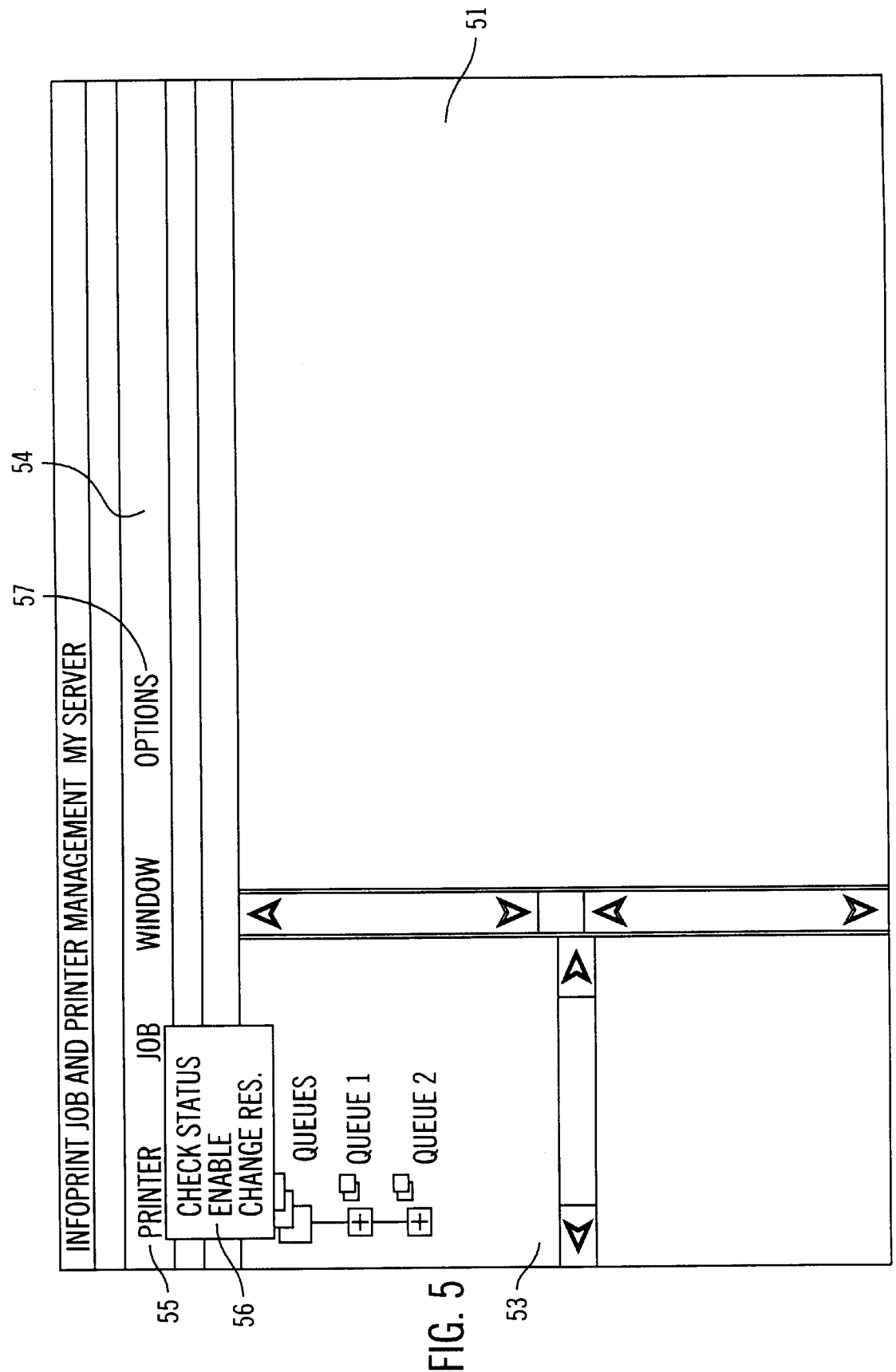
FIG. 5 is a diagrammatic view of a display screen like that of FIG. 3 including a basic set of uncustomized printer control functions except that it is for the control of a third type of printer operation, production printer production operation.
Figure 6:
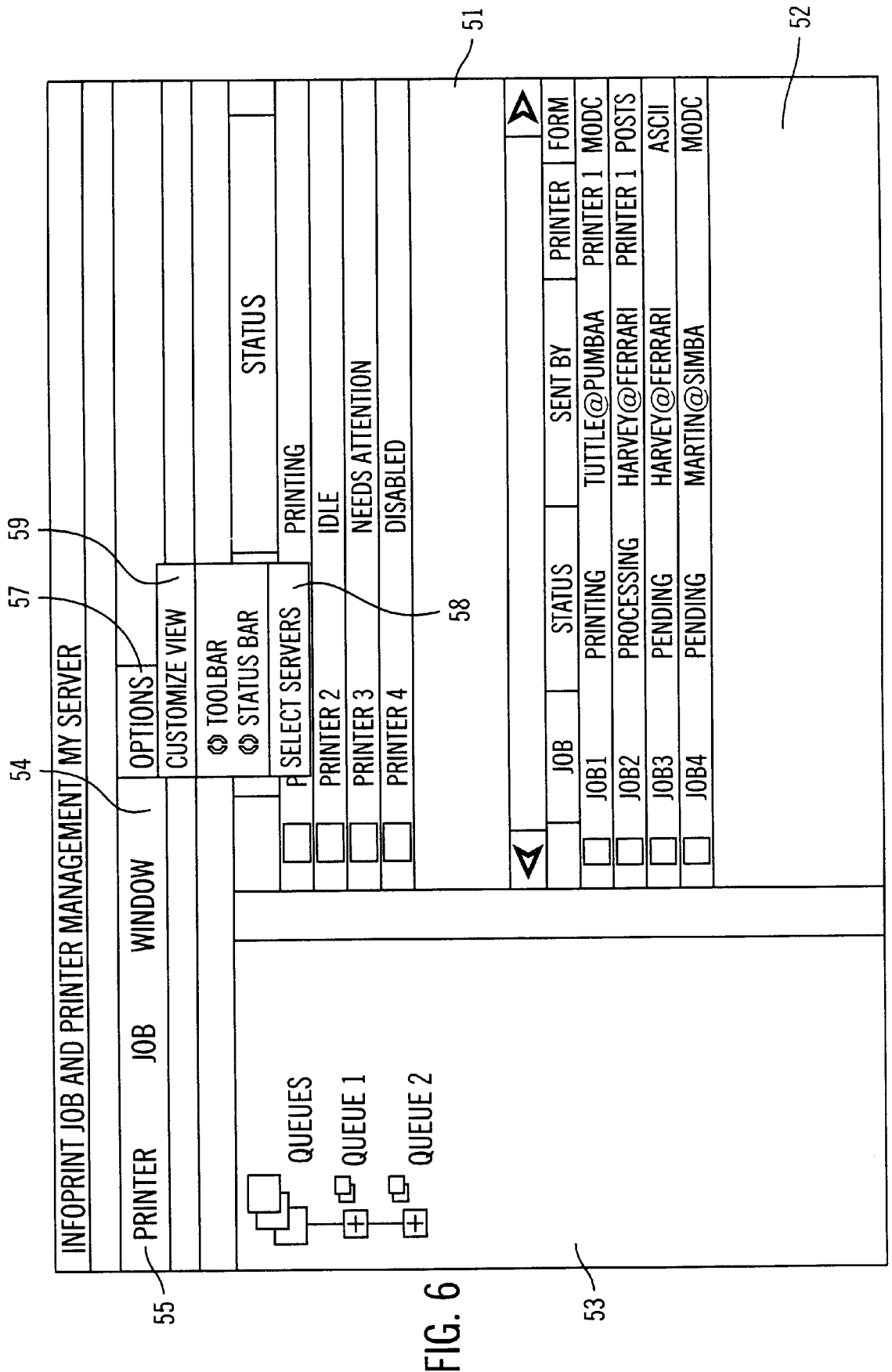
FIG. 6 is the view of the display screen of FIG. 3 showing the menu which is used when the operator needs to customize the basic set of printer control functions.
Figure 8:
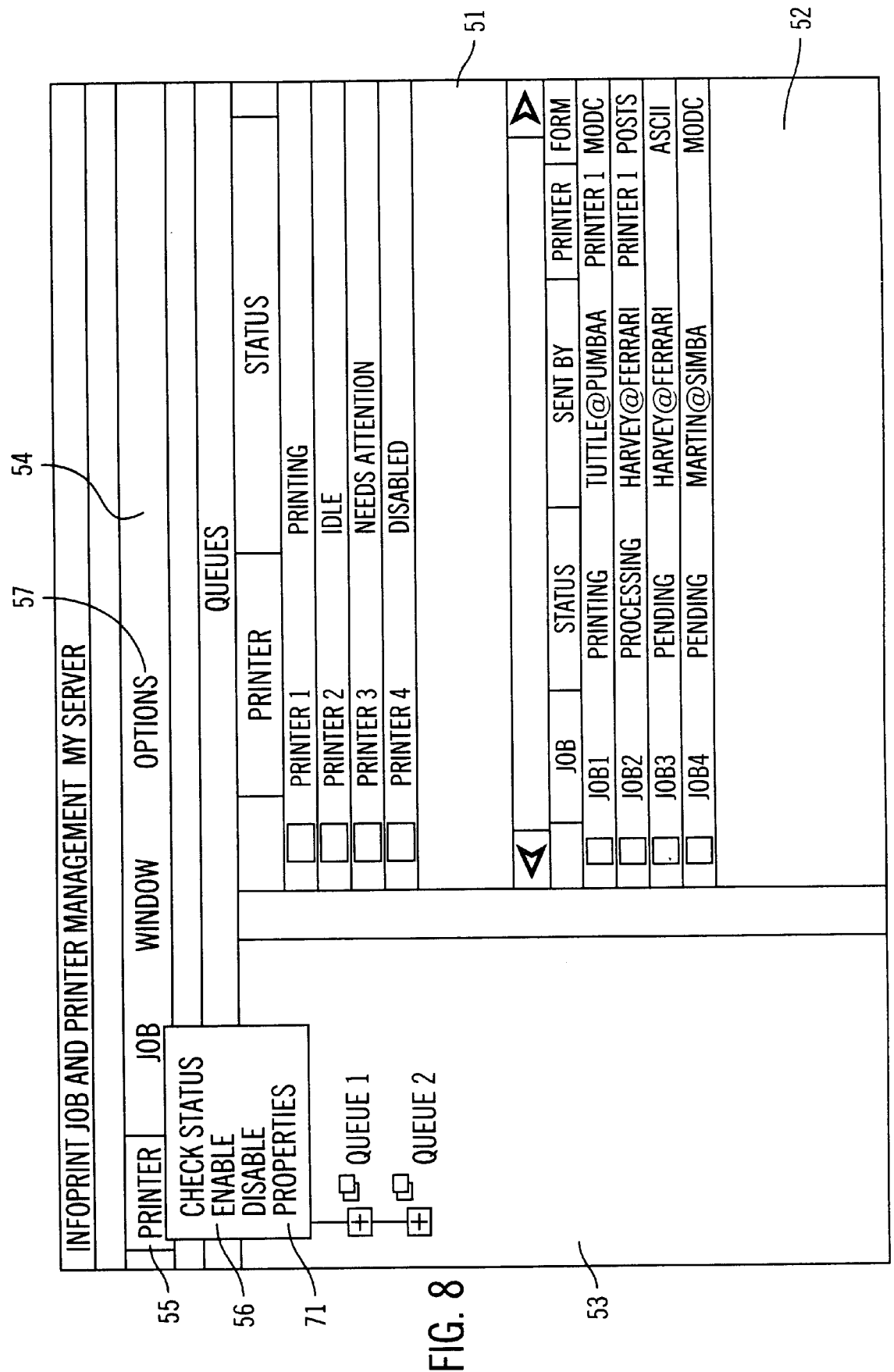
FIG. 8 is the view of the display screen of FIG. 3 showing the basic set of network printer control functions after customization.
Figure 9:
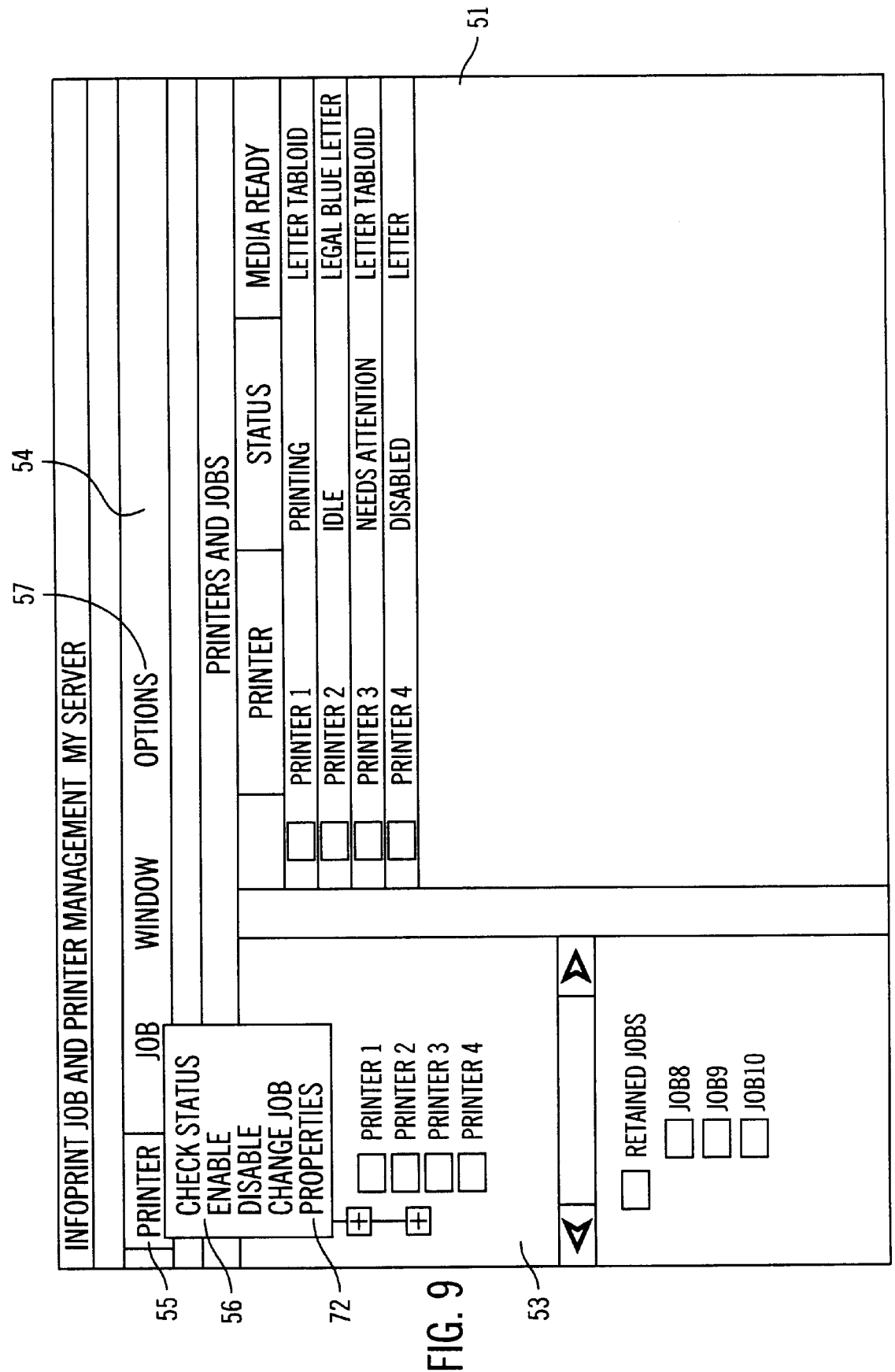
FIG. 9 is the view of the display screen of FIG. 4 showing the basic set of commercial printer control functions after customization.
Figure 10:
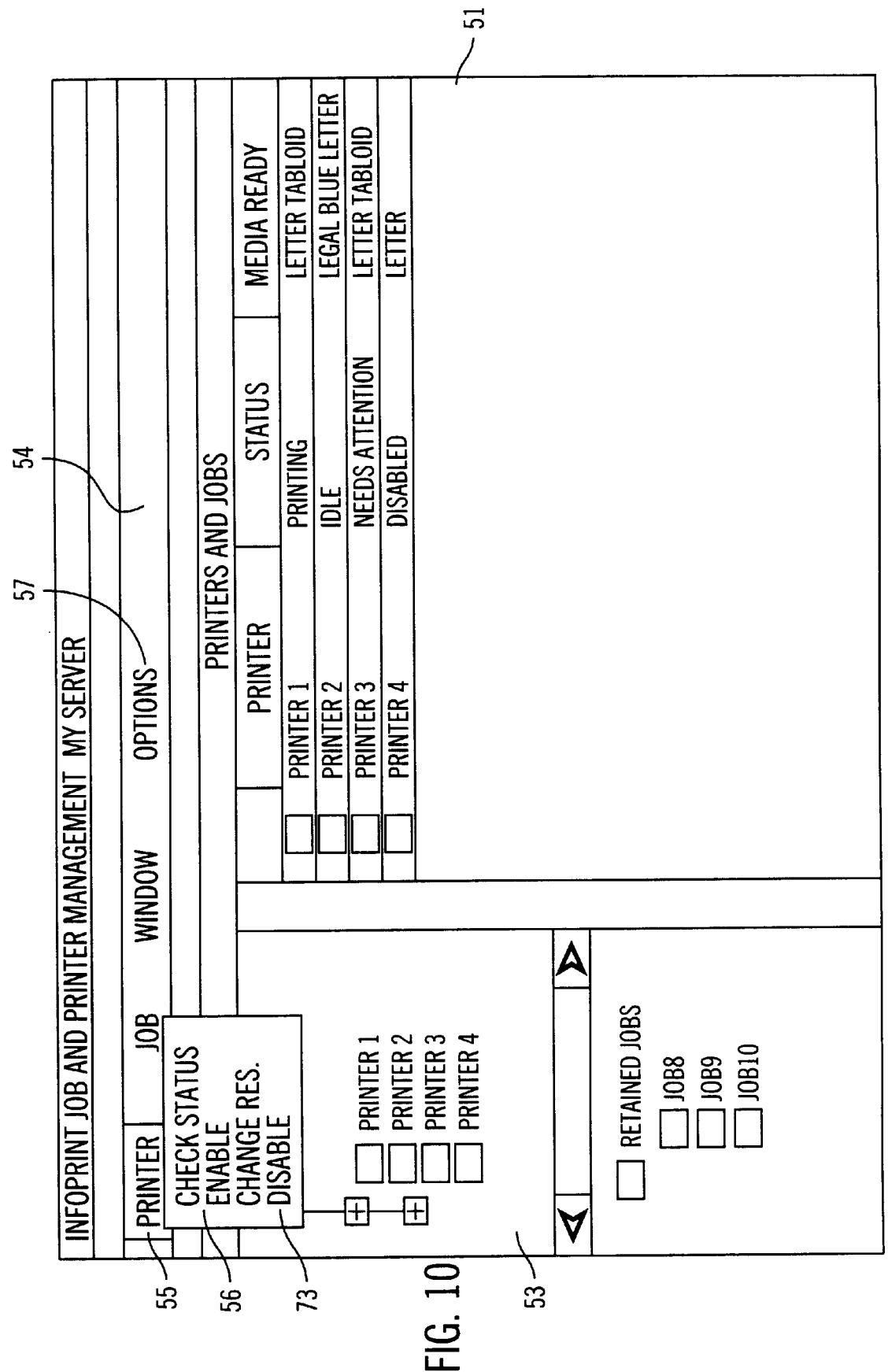
FIG. 10 is the view of the display screen of FIG. 5 showing the basic set of production printer control functions after customization.

The initial display screen of FIG. 2 shows a selection menu through which the operator of high throughput production printing may select one of three sets of printing functions, each set respectively basic to a different type of high throughput printing operation. The type of operation which is referred to as default environment is selected. This is the initial menu presenting uncustomized sets of operation functions which will be customized in accordance with the method described in our above-described copending Alimpich et al. patent application U.S. Ser. No. 09/053,210. In high throughput electrophotographic or laser printers such as the IBM InfoPrint InfoColor series of printers, this copending application presents a programming system which provides basic sets of functions for the commercial environment: print shops which print manuals and books on a job by job basis; production printing or data centers which print statements, invoices and bills; and distributed network center environments wherein workers in their offices access printers for a variety of jobs. This copending application describes how one of these basic sets of printing operation functions may be selected and then customized to meet the more specific needs of selected operations. Following the process of this copending application, the three sets of basic control functions of FIG. 2 may be customized. The interface of FIG. 2 indicates that the basic set of functions for controlling network printing operations has been selected. This brings up the network control interactive display screen of FIG. 3. When the commercial and production sets are respectively chosen in FIG. 2, this would respectively result in the display screen of FIG. 4 for control of commercial printing operations and the display screen of FIG. 5 for the control of production printing operations. These display screens are similar; each screen of FIGS. 3 to 5 presents the status of the printers, window 51, the status of jobs, window 52, and the individual printer queues, window 53. There is also a menu bar 54 from which the printer control function selection 55 may be chosen. Upon the selection of printer control function 55, a menu of the basic set of control functions 56 for each network, commercial or production operations environment is brought up as shown in FIGS. 3 through 5. Using this basic set of control functions, the operator is able to control printer functions such as enabling and disabling of printers as well as determining their status. As described in the above-referenced Alimpich et al. application U.S. Ser. No. 09/053,210, a basic set of control functions may then be customized to add other functions. This customization by activating the "Options" choice 57 on menu bar 54 as shown in FIG. 6 which shows how the set of basic functions for the network printing operations may be customized. This brings down menu 58 which presents "Customize View", option 59. This selection of this customize option 59 results in the appearance of a dialog menu for customization shown in FIG. 7 from which the operator chooses to customize the printer control functions 61. By using the window 62, scrollable via bar 63, to view possible additions to the basic set of control functions, he selects "Properties" 64, and this results in the interface screen shown in FIG. 8 in which function of printer property control 71 is now offered in the customized set 56 of printer 55 control functions for the control of network printing operations. Following the same procedure, the basic function interface screen for controlling commercial printing operation shown in FIG. 4 is customized to the customized control screen of FIG. 9 for controlling such commercial printing operations through the addition of the "Properties" control function 72 and the basic function interface screen for controlling the production printing operation shown in FIG. 5 is customized to the customized control screen of FIG. 10 for controlling such production printing operations through the addition of the "Disable" control function 73. While the customization of the sets of basic control functions has been illustrated by the addition of one function to each basic set, it should be understood that a great many functions may be added in the same manner to each basic set as required for the specific printing operations.

At this point, we now have several sets of customized basic printer operation functions from which we may select from and switch back and forth between. This selection and switch may be done through the interactive display screen interface illustrated in FIG. 11. The screen indicates that all of the functions have been customized. Any of the customized sets of functions may be initially selected by pointing means such as the above-described cursor control means. If a customized operation has been selected, another may be conveniently switched to by moving to another of the choices, such as customized commercial printing choice 75 and clicking on the OK button 74 which brings up the customized commercial control screen of FIG. 9. Similarly, customized production printing choice 76 brings up the customized production control screen of FIG. 10 and customized network choice 77 which brings up the customized network printing control screen of FIG. 8.

Alternatively, in other embodiments, the user may switch between any of the selectable user interfaces (or sets of functions) initially displayed to the user for selection as shown in FIG. 2. That is, the user is not required to switch between only the customized interfaces, but can also switch between the interface as originally provided.

Figure 12A:
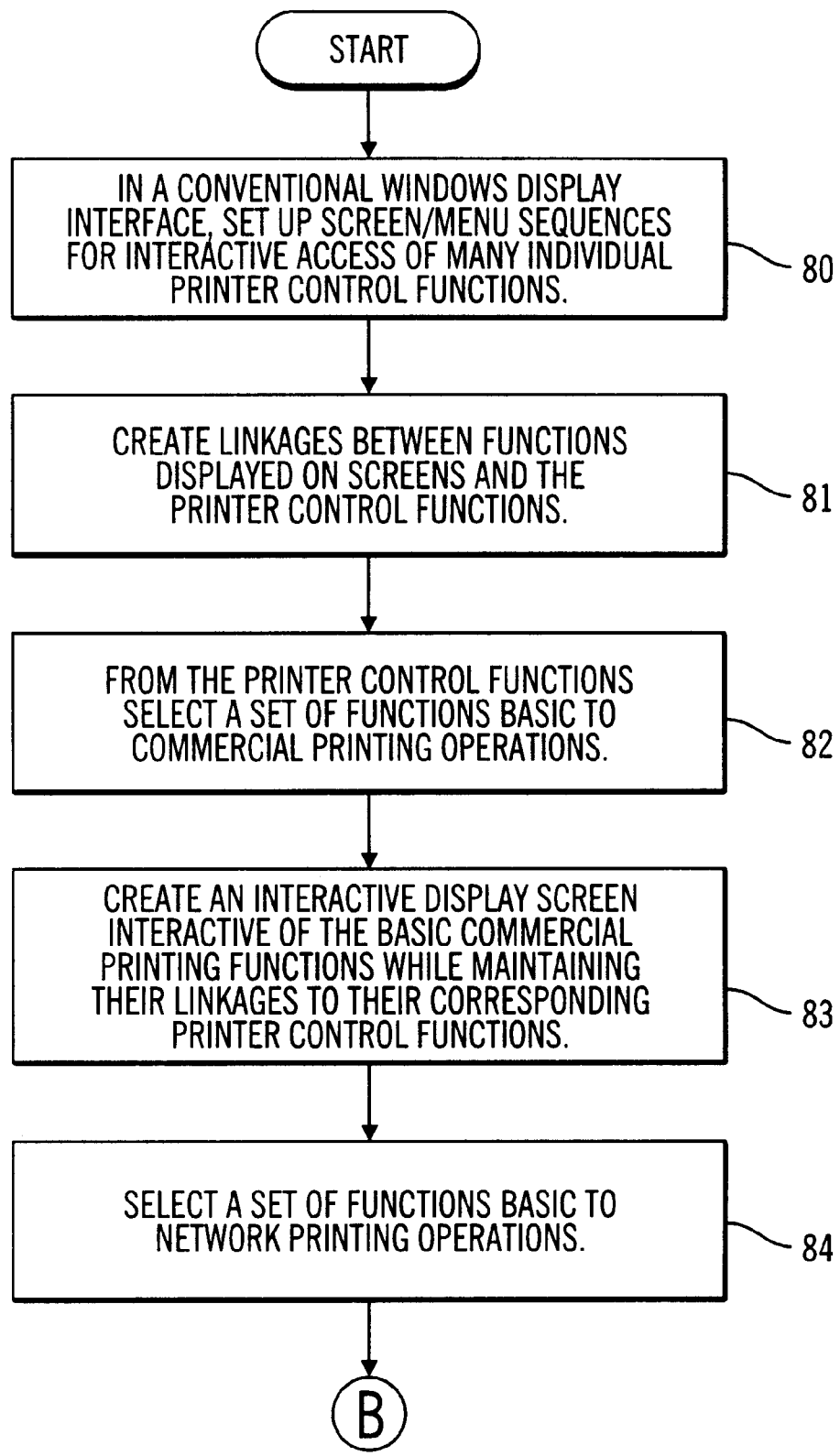
FIGS. 12A through 12C are a flowchart showing the development of a program for interactively presenting selectable sets of basic types of printer control functions and for customizing such basic set of functions and for switching between such customized functions according to the present invention.
Figure 12B:
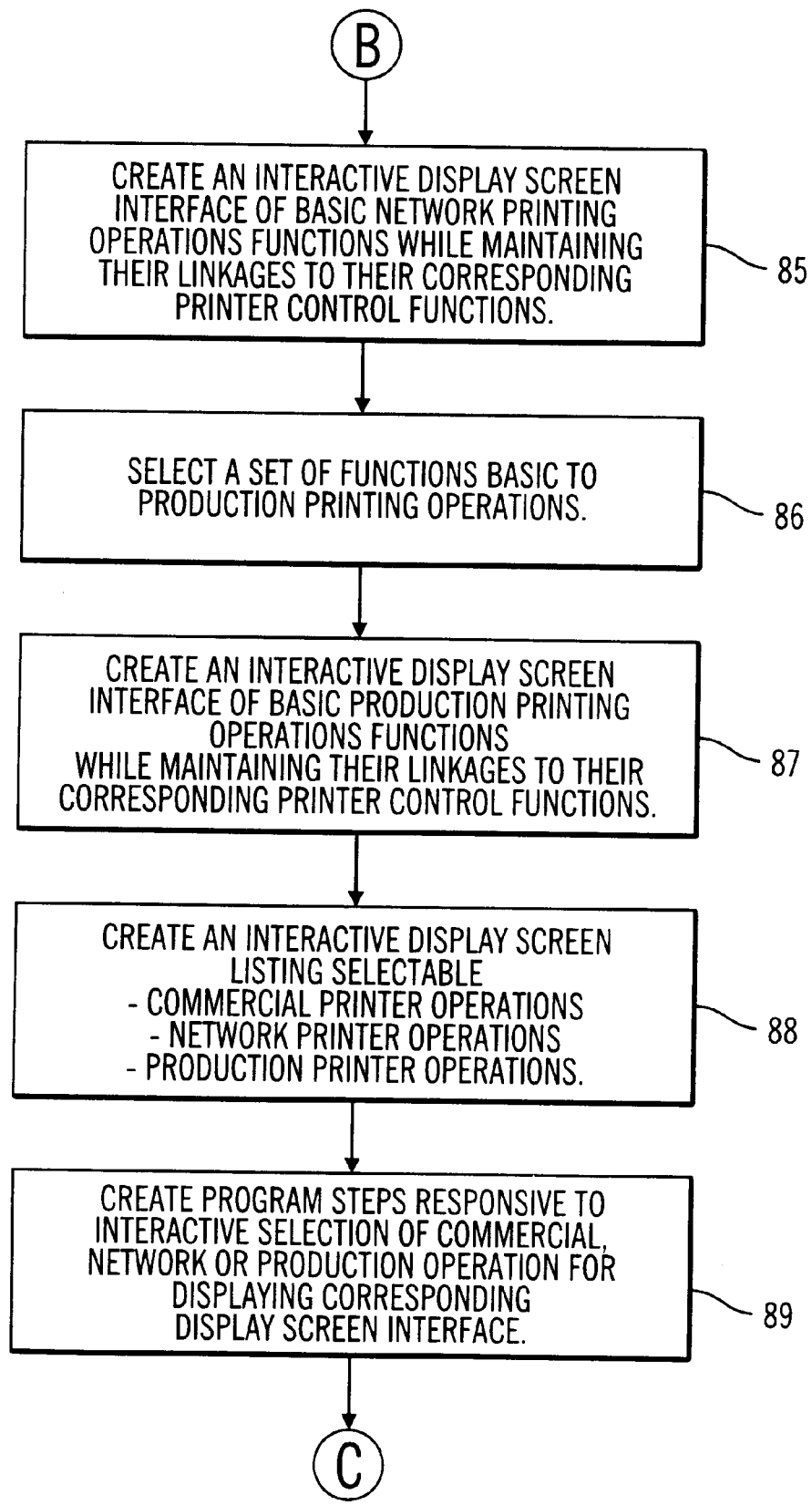
Figure 12C:
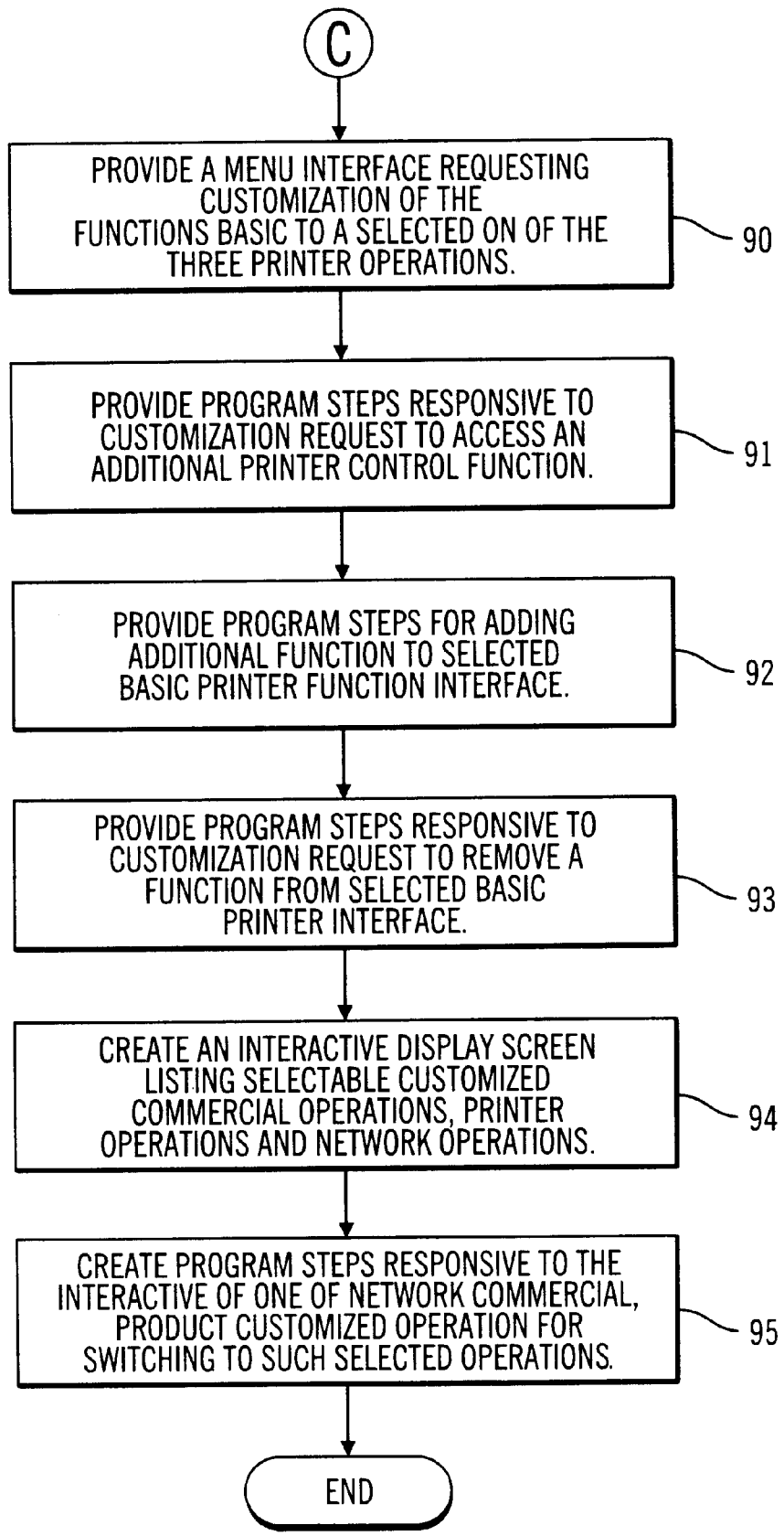

Now with reference to FIGS. 12A through 12C, we will describe a process implemented by a program according to the present invention. The flowchart is in three parts (FIGS. 12A, 12B and 12C). The program is continuous and involves the development of the display screen interfaces previously described with respect to FIGS. 2 though 11. Much of the process will have been already described in the above referenced Alimpich et al. application U.S. Ser. No. 09/053, 210. In the flowchart of FIG. 12A, a basic window interface is set up, step 80, whereby the operator may control printer functions, e.g. an interface like that of FIG. 3. Of course, appropriate conventional linkages are set up between representations of functions displayed on a screen whether these representations be text or icons representative of the functions, and the functions themselves, step 81. Then, step 82, a set of printer control functions basic to a commercial type of printer operation is set up, and an appropriate interface to said set of functions is also set up, step 83, while maintaining the linkages between the representations of these basic functions on the display screen and the functions themselves. This provides the display screen interface of FIG. 4. Next, steps 84 and 85 respectively repeat steps 82 and 83 to set up an interactive set of functions basic to network printing operations to thereby provide the display screen of FIG. 3. Steps 86 and 87, FIG. 12B, respectively repeat steps 82 and 83 to set up an interactive set of functions basic to the production type of printing operations—the display screen of FIG. 5. An interactive display interface is set up from which the operator may select to operate one of the three basic sets of functions for respectively controlling one of the three basic types of printer operations, step 88. This step will provide the display screen of FIG. 2. Next, step 89, a routine is provided which in response to the selection of one of the basic operations, in the example in FIG. 2, the network type of operation was selected—displays the appropriate interface providing the basic control functions for selected printing operation. Thus, in the illustrative example, this results in FIG. 3, network interface control functions 56.

At this point, FIG. 12C provides for customization, step 90; this provides for a customization menu. Assuming in the example that the network basic functions 56, FIG. 3, are to be customized, then step 90 results in the activation of options 57, FIG. 6, the resulting menu 58 from which the customize view option 59 is selected. This results in step 91, FIG. 12C, and a routine for the selection of an additional function which has been previously described with respect to FIG. 7 wherein the properties function 64 was selected to be added to the basic set of network printing functions. Then, step 92, this property function is added to the network printing operations set of functions to provide the customized set of functions shown in FIG. 8 in which the properties control function 71 is added to the basic control functions 56. Following the same procedure, the commercial printing functions are similarly customized to produce the screen interface of FIG. 9 with the basic control functions 56 customized through addition of properties control function 72. Also, following the same procedure, the production printing functions are similarly customized to produce the screen interface of FIG. 10 with the basic control functions 56 customized through addition of disable control function 73. The program further provides for the removal of a function from a set of control functions, step 93, in a similar manner.

An interactive display interface is set up from which the operator may select to operate one of the three customized basic sets of functions for respectively controlling one of the three basic types of printer operations, step 94. This step will provide the display screen of FIG. 11 which has the listed customized basic printing functions: commercial printing operations 75, production printing operations 76 and network printing operations 77 and a switch 74 representation for switching from one selection to another.

Figure 13:
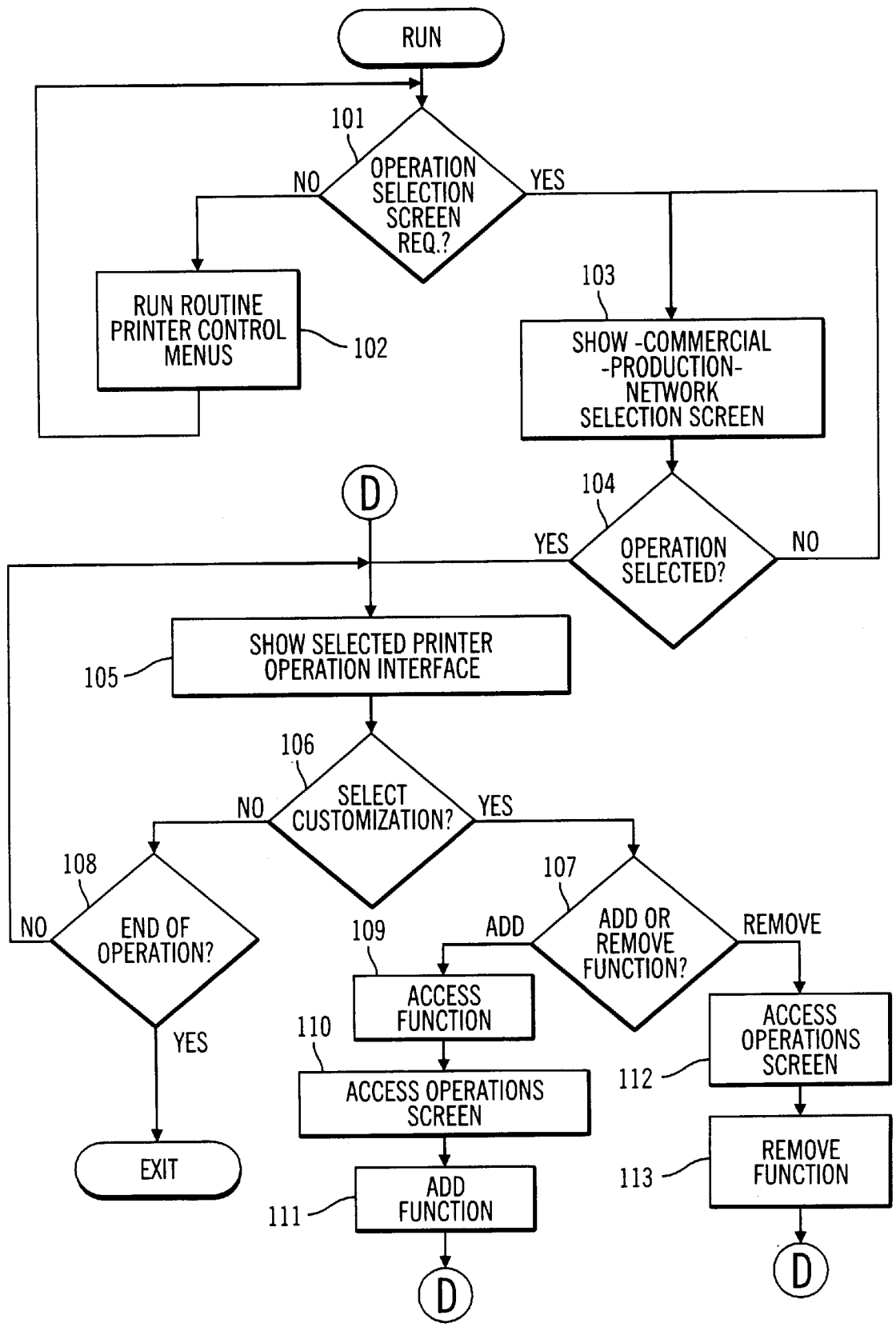
FIG. 13 is a flowchart showing the running of the program described with respect to FIGS. 12A through 12C in order to customize each of the sets of basic control functions.

Now that the basic programs have been described and illustrated, there will be described with respect to FIG. 13, a flow of a simple operation showing how the program could be run to produce the customized sets of basic functions. First, decision step 101, a determination is made as to whether the operator wishes to select one of the sets of functions basic to a type of printer operation. If not, then step 102, the printer could be run routinely with the operator selecting all functions individually until the operator selects to operate under a set of basic control functions. If the decision from step 101 is yes, then in step 103, the display screen of FIG. 2 is presented to the operator, and when, in step 104, the operator selects a type of operation, then, step 105, the control interface containing the basic set of functions would be shown to the operator. For this example let us assume that this would be the network type printing control functions in menu 56 of FIG. 3. Then, decision step 106, a determination is made as to whether the operator has selected customization. If he has not, then the interface continues to be maintained uncustomized until it is determined in step 108 that the operation is over and thus exited. On the other hand, when customization is selected, then the flow moves to step 107 and the menu 58, FIG. 6, results in the customization interface of FIG. 7 through which, step 107, FIG. 13, function is to be added or removed. To add, as has been previously described, the function is accessed, step 109, via window 62, FIG. 7, and added, step 111, to provide menu 56 of FIG. 8 in the operations screen, step 110. As a result, we have the customized display screen of FIG. 8 wherein the Properties function 71 has been added to the control functions 56 for customized network type printing. In a similar manner, the basic commercial printing operations screen of FIG. 4 may be customized to provide the previously described display interface of FIG. 9, and the basic production printing operations screen of FIG. 5 may be customized to provide the previously described display interface of FIG. 10. After the customization, the process is returned to step 105 via branch D. To remove, in a similar way, the basic printer operations control screen (FIGS. 3, 4 or 5) may be accessed, step 112, and the function is removed, step 113, and thereafter returned to step 105 via branch D.

Figure 11:
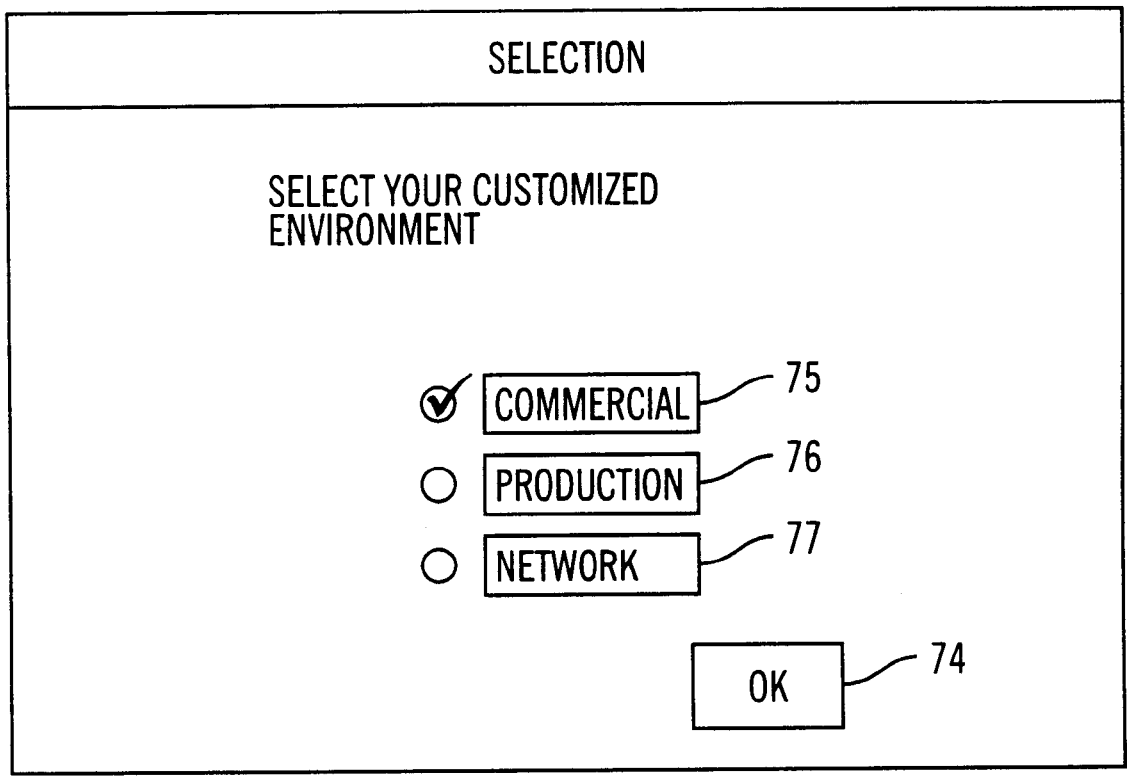
FIG. 11 is the diagrammatic view of the menu of FIG. 2 after customization.
Figure 14:
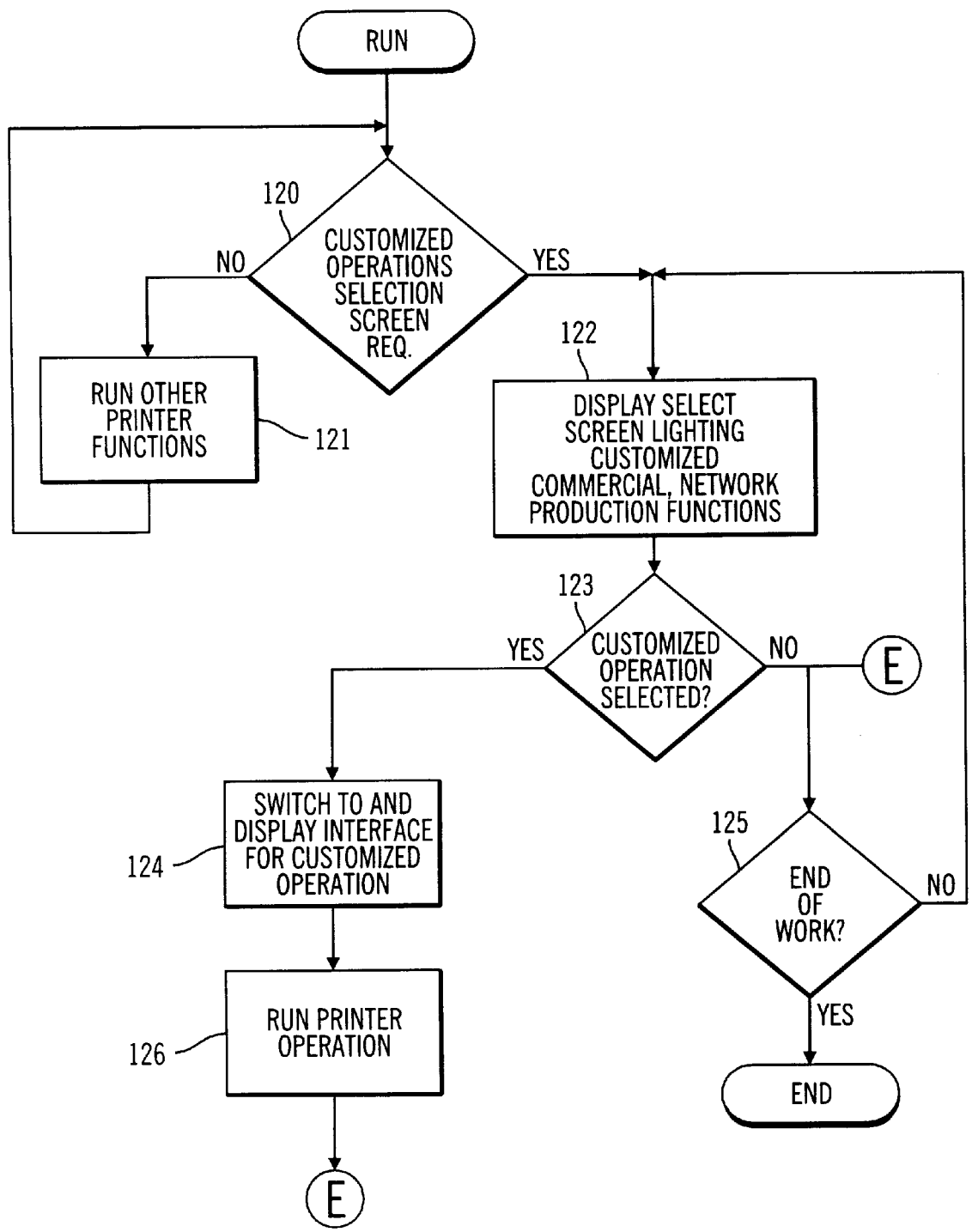
FIG. 14 is a flowchart showing the running of the program to switch back and forth between the customized sets of basic control functions.

Now with respect to FIG. 14 we will give a simple example of the switching operations between customized printer operations control functions. First, a determination is made, step 120, as to whether the operator has requested the screen of FIG. 11 for customized printer operation. If no, then step 121, the printer could be run routinely with the operator selecting all functions individually until the operator selects to operate under a set of basic control functions. If the decision from step 120 is yes, then, in step 122, the display screen of FIG. 11 is presented to the operator and when, in step 123, the operator selects a type of operation, then, step 124, the customized control interface containing the customized set of functions would be switched to and shown to the operator, and the operator could control the printer operation from the interface, step 126. After the completion of the operation involving the customized set of functions, and then the program branches to step 125 where a determination is made as to whether we are at the end of the work schedule. We would have also been at step 125 if no customized operation had been selected in step 123. If we are at the end of scheduled work, then the run is ended. If not, then the program is returned to step 122 and the menu of selectable customized printer control operations of FIG. 11 is shown to the operator. He may commence a switch to another type of customized printer control function by selecting the switch representation 74.

In a printing environments including commercial, production and network, the user interface for an application which manages and controls these environments may have a lot of complicated function and be overwhelming to a user. A set of default views are provided for the user to customize. The user can customize these views individually. For example, if the user was a commercial user, the user would bring up the commercial view of the user interface. The user could then customize this view to add functionality that the user wanted but was not provided by the initial "default" view of the interface for this commercial environment. For a network user, the network would bring up the network default view of the application and customize this view, if desired. A production user would bring up the production view of the user interface tailored to a production printing environment which also would be customizable. For customers having more than one of these printing environments, the customers can switch between any of these different views. As such, there is a single user interface displayed in any given view. For example, if the customer brought up a commercial view of the user interface and customized this view specifically for the customer's commercial printing environment, he could then switch to a production view of the application using the production view user interface and customizing the production user interface, if desired. The customer could then switch back to the commercial view of the application and have all of the original commercial options in addition to anything which was customized.

There are a plurality of default views, each having a different set of interactive functions. For example, for the application which manages printing environments, there is a commercial default view of the user interface, a production default view of the user interface and a network default view of the user interface. Each one of these views can be customized. A user can switch back and forth between each of these views depending upon how the user is running the printing environment.

For example, for a customer that runs in a commercial environment during the day and then, at night, runs a production type of environment, the user can use the same user interface, customize each of the views to work the way that he would want the view to work and then switch back and forth depending upon what time of the day it was. It is still the single user interface but different views, but different views customized in different ways. The invention provides multiple default views, enables each view to be customized and enables the user to pick which view to use when the user wants it. In this multiple or "impure" printing environment, the user would be managing the same printers and the same print jobs. What is different is the way that the customer is actually viewing the printing environment, the print jobs and the printers. There is nothing different about the printers and the print jobs underneath. It is how the customer wants to manage the printers and print jobs, how to view them and what types of things he wants to be able to do to them.

While the present invention has been described using printing operations as the illustrative example, the invention is equally applicable to the monitoring and control of a wide variety of industrial, chemical and manufacturing production operations, including the manufacturing of integrated circuits, as well as automated tool and die production. In production in all of these areas, it would be advantageous to provide several production control programs which are generic to a group or class of production, including a selectable customized set of basic functions for control of one of a plurality of types of production operations plus the ability to readily switch between such customized sets of controls.

Although certain preferred embodiments have been shown and described, it will be understood that many changes and modifications may be made therein without departing from the scope and intent of the appended claims.

What is claimed is:

1. A computer controlled display system for the interactive control of a plurality of types of data processor controlled operations, comprising:

means for providing a plurality of user interactive display interfaces for one application program, wherein each user interactive display interface provides a different set of basic interactive functions for the control of one of said plurality of types of application program operations, wherein each user interactive display interface displays a plurality of same basic interactive functions to perform same application program operations and at least two of the user interactive display interfaces include different interactive functions to perform different application program operations, wherein each user interactive display interface provides a separate view of functions to control the application program, and means for enabling a user to select one of the plurality of user interactive display interfaces to interact with at least one of said sets of basic interactive functions for the interactive control of one of said types of operations for the application.

2. The display system of claim 1, further including:

means for switching from said selected one of said plurality of user interactive displays interfaces providing access to one of said sets of basic interactive functions to a selected second one of said user interactive display interfaces providing access to a second set of basic interactive functions, and means for interactively controlling another one of said control operations through said second selected user interactive display interface.

3. The display system of claim 1, further including means for customizing the basic interactive functions provided in the user interactive display interfaces to add at least one additional function to one or more of the user interactive display interfaces, whereby said switching means switches between user interactive display interfaces having customized sets of basic interactive functions.

4. The display system of claim 1, further including means for customizing basic interactive functions provided in the user interactive display interfaces by deleting at least one function from one or more of the user interactive display interfaces, whereby said switching means switches between user interactive display interfaces having customized sets of basic interactive functions.

5. The display system of claim 1, wherein at least two of said interfaces require different levels of interactive user skills.

6. The display system of claim 1 wherein said application program operations are production operations.

7. The display system of claim 6 wherein said production operations are printing operations.

8. The display system of claim 7 wherein said printing operations include controlling a plurality of printers.

9. The display system of claim 6 wherein said production operations are chemical processing operations.

10. The display system of claim 6 wherein said production operations are manufacturing operations.

11. The display system of claim 10 wherein said manufacturing operations are integrated circuit manufacturing operations.

12. The display system of claim 6 wherein said production operations are tool and die production operations.

13. The display system of claim 1, further including:
means for providing a dialog box enabling a user to select one of the user interactive display interfaces to display.

14. The display system of claim 1, wherein one user interactive display view is displayed such that the basic set of interactive functions of one user interactive display is not displayed when another user interactive display interface is user selected and displayed.

15. In a computer controlled display system, a method for the interactive control of a plurality of types of data processor controlled operations comprising:
providing a plurality of user interactive display interfaces for one application program, wherein each user interactive display interface provides a different set of basic interactive functions for the control of one of said plurality of types of application program operations, wherein each user interactive display interface displays a plurality of same basic interactive functions to perform same application program operations and at least two of the user interactive display interfaces include different interactive functions to perform different application program operations, wherein each user interactive display interface provides a separate view of functions to control the application program, and
enabling a user to select one of the plurality of user interactive display interfaces to interact with at least one of said sets of basic interactive functions for the interactive control of one of said types of operations for the application.

16. The method of claim 15, further including:
means for switching from said selected one of said plurality of user interactive displays interfaces providing access to one of said sets of basic interactive functions to a selected second one of said user interactive display interfaces providing access to a second set of basic interactive functions, and
means for interactively controlling another one of said control operations through said second selected user interactive display interface.

17. The method of claim 15, further including customizing basic interactive functions provided in the user interactive display interfaces to add at least one additional function to one or more of the user interactive display interfaces, whereby said switching is between user interactive display interfaces having customized sets of basic interactive functions.

18. The method of claim 15, further including customizing basic interactive functions provided in the user interactive display interfaces by deleting at least one function from one or more of the user interactive display interfaces, whereby said switching is between user interactive display interfaces having customized sets of basic interactive functions.

19. The method of claim 15, wherein at least two of said interfaces require different levels of interactive user skills.

20. The method of claim 15, wherein said application program operations are production operations.

21. The method of claim 20 wherein said production operations are printing operations.

22. The method of claim 21 wherein said printing operations include a plurality of controlled printers.

23. The method of claim 20 wherein said production operations are chemical processing operations.

24. The method of claim 20 wherein said production operations are manufacturing operations.

25. The method of claim 24 wherein said manufacturing operations are integrated circuit manufacturing operations.

26. The method of claim 20 wherein said production operations are tool and die production operations.

27. The method of claim 15, further including:
means for providing a dialog box enabling a user to select one of the user interactive display interfaces to display.

28. The method of claim 15, wherein one user interactive display view is displayed such that the basic set of interactive functions of one user interactive display is not displayed when another user interactive display interface is user selected and displayed.

29. In a computer controlled display system, a method for the interactive control of a plurality of types of data processor controlled operations comprising:
providing a plurality of sets of basic interactive functions, each set respectively for the control of one of said plurality of types of operations;
enabling a user to select at least one of said sets of basic interactive functions for the interactive control of one of said types of operations;
switching from said selected one of said of sets of basic interactive functions to a selected second one of said sets of basic interactive functions;
interactively controlling another one of said control operations through said second selected set of basic interactive functions;
customizing a plurality of said sets of basic interactive functions to add at least one additional function respectively to each set, whereby said switching is between customized sets of basic interactive functions; and
providing a user interactive display interface for each of said plurality of customized sets of basic interactive functions whereby each of said types of operations may be controlled through said interface.

30. A program implemented on a computer useable medium, wherein the program includes code capable of causing a computer to perform:
providing a plurality of user interactive display interfaces for one application program, wherein each user interactive display interface includes a different set of basic interactive functions for the control of application program operations, wherein each user interactive display interface displays a plurality of same basic interactive functions to perform same application program operations and at least two of the user interactive display interfaces include different interactive functions to perform different application program operations, wherein each user interactive display interface provides a separate view of functions to control the application program, and a user to select one of said plurality of user interactive display interfaces for interacting with the application program.

31. The program of claim 30, wherein the program code is further capable of causing the computer to perform enabling a user to switch back and forth between the plurality of user interactive display interfaces.

32. The program of claim 30, wherein the program code is further capable of causing the computer to perform:

enabling a user to customize each of the selectable user interactive display interfaces, and enabling a user to switch back and forth between the plurality of customized user interactive display interfaces.

33. The program of claim 30 wherein there is a separate selectable user interface for a commercial print environment, a product print environment and a network print environment.

34. The program of claim 33 further comprising program code means for enabling a user to switch back and forth between the plurality of user interfaces during a current execution of the program.

35. The program of claim 30 wherein at least two of the user interactive display interface views represent a different operating environment.

36. The program of claim 30, wherein at least two of the user interactive display interface views represent a different skill level of an intended user.

37. The program of claim 30, wherein the program code is further capable of causing the computer to perform:

providing a dialog box enabling a user to select one of the user interactive display interfaces to display.

38. The program of claim 30, wherein one user interactive display view is displayed such that the basic set of interactive functions of one user interactive display is not displayed when another user interactive display interface is user selected and displayed.

* * * * *